US010223319B2

(12) United States Patent
Nakagawa et al.

(10) Patent No.: US 10,223,319 B2
(45) Date of Patent: Mar. 5, 2019

(54) COMMUNICATION LOAD DETERMINING APPARATUS

(71) Applicant: DENSO CORPORATION, Kariya, Aichi-pref. (JP)

(72) Inventors: Tetsuo Nakagawa, Kariya (JP); Tomohisa Kishigami, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 735 days.

(21) Appl. No.: 13/949,490

(22) Filed: Jul. 24, 2013

(65) Prior Publication Data

US 2014/0047146 A1 Feb. 13, 2014

(30) Foreign Application Priority Data

Aug. 9, 2012 (JP) ................................. 2012-177163

(51) Int. Cl.
G06F 11/34 (2006.01)
G06F 13/42 (2006.01)
H04L 12/64 (2006.01)

(52) U.S. Cl.
CPC .......... *G06F 13/42* (2013.01); *G06F 11/3419* (2013.01); *G06F 11/3495* (2013.01); *H04L 12/6418* (2013.01)

(58) Field of Classification Search
CPC ... G06F 11/3419; G06F 11/3495; G06F 13/42
See application file for complete search history.

(56) References Cited

U.S. PATENT DOCUMENTS

| 5,548,590 A * | 8/1996 | Grant ................... H04L 43/00 370/252 |
| 7,929,461 B2 * | 4/2011 | Ramesh ............... H04L 43/045 370/257 |
| 2002/0133629 A1 * | 9/2002 | Jones ................ A61K 49/0008 709/249 |

(Continued)

FOREIGN PATENT DOCUMENTS

JP 2008-211644 9/2008

*Primary Examiner* — Tim T Vo
*Assistant Examiner* — Phong H Dang
(74) *Attorney, Agent, or Firm* — Harness, Dickey & Pierce, P.L.C.

(57) ABSTRACT

A communication load determining apparatus is used for a communication system which includes a plurality of communication devices performing communication via a common bus. The communication system operates in accordance with a communication protocol that defines which a priority order is set to each of the frames transmitted from the communication devices and which a frame having a lower priority has a longer transmission latency before being transmitted to the bus. In the communication load determining apparatus, a low-priority frame having a lower priority than other frames to the bus is transmitted, and a transmission latency of the low-priority frame is measured. The communication load determining apparatus determines whether or not abnormality has occurred in a communication load in the bus on the basis of the measured transmission latency to produce a determination result. The produced determination result is stored.

16 Claims, 3 Drawing Sheets

(56) References Cited

U.S. PATENT DOCUMENTS

| | | | | |
|---|---|---|---|---|
| 2006/0171410 A1* | 8/2006 | Jung | ............... | H04L 12/40143 370/447 |
| 2006/0176830 A1* | 8/2006 | Yakashiro | ........... | H04L 12/4015 370/256 |
| 2006/0285501 A1* | 12/2006 | Damm | ................ | H04L 41/142 370/252 |
| 2007/0008904 A1* | 1/2007 | Ramesh | ............... | H04L 43/045 370/252 |
| 2007/0050095 A1* | 3/2007 | Nelson | ............... | B60R 16/0231 701/1 |
| 2008/0186870 A1* | 8/2008 | Butts | ................ | H04L 41/0659 370/252 |
| 2010/0306422 A1* | 12/2010 | Kodama | .............. | H04L 12/413 710/30 |
| 2011/0029704 A1* | 2/2011 | Itou | ................ | H04L 12/40163 710/110 |

\* cited by examiner

COMMUNICATION LOAD DETERMINING APPARATUS

CROSS-REFERENCE TO RELATED APPLICATION

This application is based on and claims the benefit of priority from earlier Japanese Patent Application No. 2012-177163 filed Aug. 9, 2012, the description of which is incorporated herein by reference.

BACKGROUND

Technical Field

The present invention relates to a communication load determining apparatus that detects the occurrence of abnormality in a communication load in a system in which a plurality of communication devices are connected to a common bus and perform intercommunication via the bus.

A communication system based on a multiple access method is well known. In such a system, a plurality of communication devices are connected to a common bus and perform intercommunication via the bus. With this configuration, each communication device can cooperate with other communication devices to carry out various processes.

Related Art

An example of such a communication system may be an in-vehicle communication system (in-vehicle LAN (local area network)) to which the CAN (controller area network) protocol based on CSMA/CA (carrier-sense multiple access with collision avoidance) scheme is applied.

In a system applied to the CAN protocol, a frame has a header portion in which an identifier (ID) is set for the identification of the communication device as an original transmitter, or the contents of data that are set in a subsequent area. Each of the frames is provided with such an ID. Such a system is ensured to perform arbitration control according to the CAN protocol. Under the arbitration control, when a plurality of frames are concurrently transmitted onto the bus, a right of transmitting a frame (transmission right) is given to the communication device that has transmitted a frame with an ID code of a minimum logical value.

An in-vehicle communication system includes a connector that connects the system to an external tool (hereinafter referred to as external-connection connector). Such an external tool diagnoses conditions of the vehicle or rewrites various programs of electronic control units (ECUs) which are connected to the in-vehicle LAN (i.e. reprograms ECUs). Usually, the connector is a general-purpose standard product and hence can be connected to various machines, such as mobile phones or computers.

Therefore, there is a concern that a third party may maliciously connect some sort of machine to the in-vehicle system via the external-connection connector to produce degradation of the processing functions of the in-vehicle system.

For example, a fraudulent device which, once connected to the external-connection connector, continues transmitting a frame (hereinafter referred to as dummy frame) allocated with an ID code with a minimum logical value may be connected.

When such a fraudulent device is connected, the dummy frame prevents transmission of the frames that should originally be transmitted to the in-vehicle LAN. As a result, the communication load of the in-vehicle LAN becomes extraordinarily large and may thereby cause abnormality in the behaviors of the vehicle.

Thus, if variation in the communication load can be detected, the detection may be used for determining the occurrence of abnormality in the communication load and further for determining connection of a fraudulent device.

As one example, JP-A-2008-211644 discloses an apparatus for detecting variation in a communication load. In the apparatus, an amount of data (number of bits) that are received in a unit time, for example, is detected as a communication load of a bus.

However, in the apparatus disclosed in JP-A-2008-211644, a measuring device (any ECU or a device dedicated to measurement) used for measuring the communication load of the bus is required to receive all of data that appear on the bus and calculate a total amount of received data in a predetermined measurement period. For this purpose, the measuring device is required to ensure a memory capacity that can receive all data, without omission, in the measurement period. Alternatively, if a sufficient memory capacity cannot be ensured, the measuring device is required to complete calculation of an amount of data of each received communication frame, for sequential addition, before receiving the subsequent communication frame. As a result, the CPU that configures the measuring device suffers from a large load. Further, a memory having a large capacity is required to be prepared as the memory that configures the measuring device.

In addition, in the above technique, as the measurement period becomes longer, higher measurement accuracy will be achieved. For this reason, as the measurement accuracy is attempted to be more enhanced, the problems set forth above become more prominent.

These problems are common to communication systems that perform communication via a common bus, not being limited to such in-vehicle LANs.

SUMMARY

The present disclosure provides a communication load determining apparatus which is able to determine the occurrence of abnormality in a communication load without increasing a processing load of a CPU or a memory capacity that should be ensured for the reception of communication frames.

The load determining apparatus of the present disclosure is used for a communication system in which a plurality of communication devices perform communication via a common bus. However, the communication system has the premise of using a communication protocol that defines a priority of each of the frames transmitted from the communication devices and in which a frame having a lower priority has a longer transmission latency before being transmitted to the bus.

In the load determining apparatus, a low-priority frame transmitting means transmits a low-priority frame having a lower priority than other frames to the bus, while a measuring means measures a transmission latency of the low-priority frame Further, a determining means determines whether or not abnormality has occurred in a communication load in the bus on the basis of the transmission latency measured by the measuring means, while a storing means stores the result of the determination made by the determining means.

Thus, the load determining apparatus of the present disclosure, which uses a function based on a communication protocol, can measure a communication load of the bus and determine the occurrence of abnormality in the communication load with a simple configuration of measuring a transmission latency of the low-priority frame. Further, unlike the devices based on conventional art, the load determining apparatus of the present disclosure does not have to receive the frame used for measuring the communication load. Accordingly, the load determining apparatus of the present disclosure is able to determine the occurrence of abnormality in the communication load, without increasing the processing load of the CPU or the memory capacity that should be ensured for receiving communication frames.

DESCRIPTION OF EMBODIMENTS

With reference to the accompanying drawings, hereinafter are described some embodiments to which the present invention is applied.

(First Exemplary Embodiment)
1. General Configuration

Figure 1:
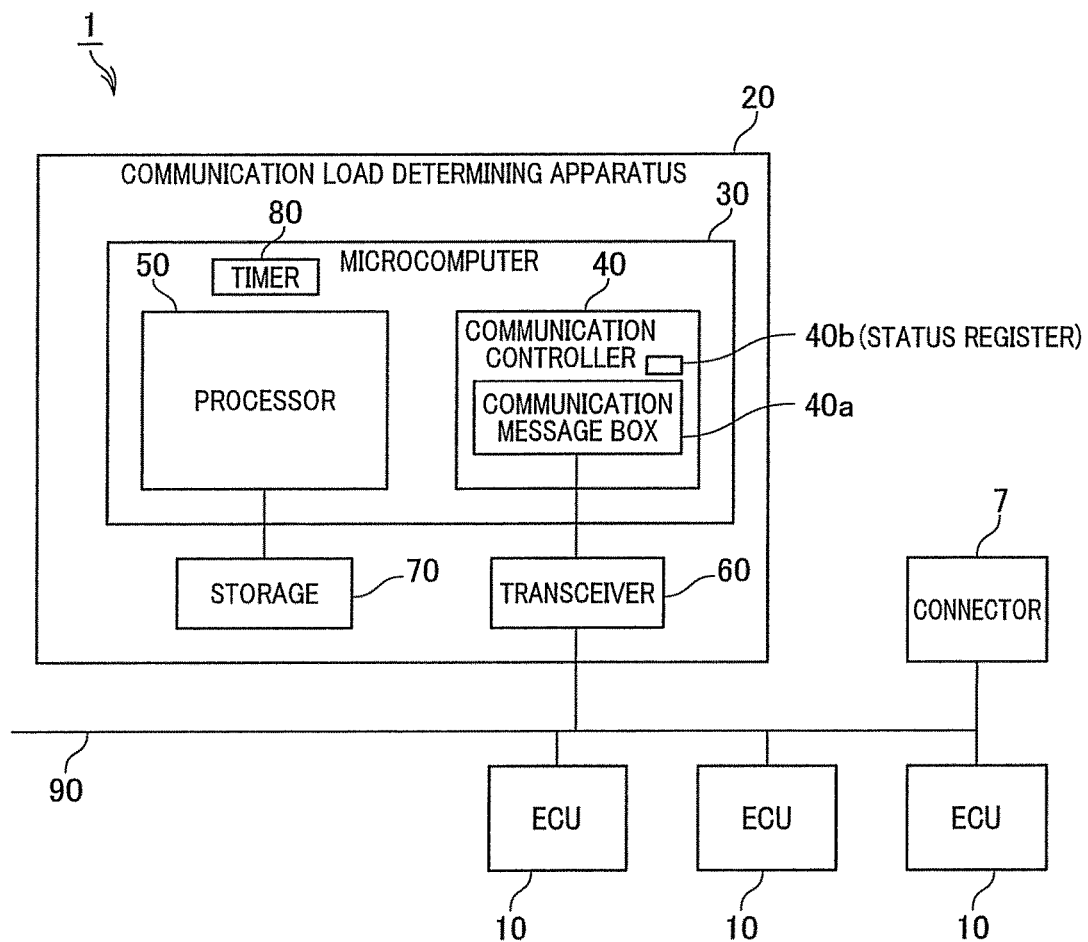
FIG. 1 is a block diagram illustrating a configuration of a communication system according to a first exemplary embodiment.

FIG. 1 is a block diagram illustrating a configuration of a communication system 1 according to a first exemplary embodiment. The communication system 1 shown in FIG. 1 is an in-vehicle communication system that uses the CAN protocol as a communication protocol.

The communication system 1 includes a plurality of electronic control units (hereinafter referred to as ECUs) 10 and a communication load determining ECU 20 (hereinafter also just referred to as ECU 20). In the communication system 1, the ECUs 10 and the ECU 20 are connected via a common bus 90 to perform intercommunication. The ECUs 10 and the ECU 20 function as communication devices (nodes).

The communication system 1 also includes a connector 7 that establishes a connection with an external tool (not shown). The connector 7 is configured by a general-purpose connector. The external tool communicates with the ECUs 10 and the ECU 20 to acquire information, based on which the external tool diagnoses the conditions of the vehicle. In addition, through the communication with the ECUs 10 and the ECU 20, the external tool rewrites (reprograms) the programs of the ECUs 10 and the ECU 20.

The ECUs 10 installed in a vehicle include an engine ECU for performing engine control of the vehicle, a brake ECU for performing brake control of the vehicle, a steering ECU for performing steering control of the vehicle, and the like. These ECUs are well known.

The CAN protocol stipulates dominant and recessive as a signal level of the bus 90. When dominant signals and recessive signals are concurrently transmitted from a plurality of ECUs, the signal level of the bus becomes dominant. Description here is given with the logical value of a dominant signal being 0 and that of a recessive signal being 1.

Figure 2:
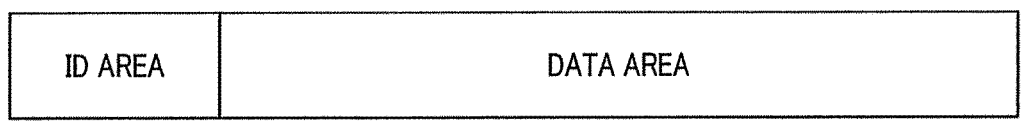
FIG. 2 is an explanatory diagram illustrating an example of a frame format of the CAN protocol used in the communication system illustrated in FIG. 1.

FIG. 2 is an explanatory diagram illustrating an example of a frame format of the CAN protocol used in the communication system 1.

As shown in FIG. 2, a frame transmitted via the bus 90 is configured by an ID area and a data area subsequent to the ID area. In the ID area, an 11-bit identification code (ID) is set for use in identifying the message set in the data area and in performing arbitration control which will be described later. In the data area, any one of messages defined in advance is set.

An ID is allocated to each of the ECUs so that different ECUs will not have an ID of the same value. Further, a type-specific ID is allocated to each frame when different-type frames are used in a single ECU.

2. Configuration of ECU

Referring to FIG. 1 again, each of the ECUs 10 is a well-known ECU that has a communication function and a processing function. Therefore, specific description of the ECUs 10 is omitted. To be specific, in the communication function, each ECU 10 performs communication according to the CAN protocol. In the processing function, each ECU 10 exchanges messages with other ECUs 10 to carry out various processes allocated to the ECU 10, cooperating with other ECUs 10.

On the other hand, the communication load determining ECU 20 includes a transceiver 60, a microcomputer 30 and storage 70. The transceiver 60 transmits/receives signals via the bus 90. The microcomputer 30 transmits/receives communication frames via the transceiver 60 to carry out the various processes. The storage 70 stores the results of the processes carried out by the microcomputer 30.

The transceiver 60 is a well-known transceiver which is configured to transmit/receive signals meeting the electrical conditions of a bus stipulated by the CAN protocol.

The microcomputer 30 includes a communication controller 40 and a processer 50. The communication controller 40 performs communication according to the CAN protocol. The processor 50 performs a process to measure a communication load via the communication controller 40.

The communication controller 40 is configured by a well-known CAN controller. The communication controller 40 at least includes a message box 40a and a status register 40b. The message box 40a stores messages, for example, which are transmitted/received between the ECUs. The status register 40b shows various statuses which are caused in relation to transmission of the messages stored in the message box 40a to the bus.

The communication controller 40 performs at least transmission control, arbitration control and notification control. Under the transmission control, a message stored in the message box 40a is framed for transmission to the bus via the transceiver 60. Under the arbitration control, the communication controller 40 performs arbitration when collision occurs between the frames on the bus. Under the notification control, the communication controller 40 gives a notification via the status register 40b, regarding a state that transmission of a message stored in the message box 40a to the bus has been completed.

Hereinafter is described an outline of the operation performed by the communication controller 40.

On condition that a message is set (stored) in the transmission message box 40a by the processor 50 while the bus 90 is open, the communication controller 40 frames the message on the basis of a storage value of the message box 40a. Then, the communication controller 40 outputs the framed message to the bus 90 via the transceiver 60. When the outputted frame collides with another frame on the bus

90 and loses the arbitration, that is, when the transmission of the frame is unsuccessful, the same frame is retransmitted (transmission control).

Also, when transmission of the frame is started under the transmission control, the communication controller 40 compares the signal level of the transmitted signal with the signal level on the bus on a bit-by-bit basis. When the signal levels of the both are different from each other, i.e. when the signal level on the bus is of a dominant signal level 0 in spite of receiving a recessive signal with level 1, the communication controller 40 determines that the arbitration has been lost. Thus, transmission of the frame is immediately stopped (arbitration control).

Specifically, since all of the frames have a different ID area, in the occurrence of a collision, one frame necessarily wins the arbitration during transmission of the ID area. More specifically, in teiuis of a logical value in which a most significant bit (MSB, also called a high-order bit) is located on a header side of the ID area, a frame having an ID that has been set to a smaller logical value wins the arbitration on the bus. In the description provided below, an ID that has been set to a maximum logical value is referred to as a lowest-priority ID, while a frame having the lowest-priority ID is referred to as a detection frame.

When transmission of the frame is successful and the message is deleted from the message box 40*a*, the communication controller 40 uses the status register 40*b* to notify the processor 50 about the completion of transmission (notification control).

3. Process Performed by Microcomputer

The processor 50 performs a communication load determination processes which is started when predetermined starting conditions are met. The starting conditions may be set such that the present process is started according to a predetermined cycle, with the cycle being randomly set. Alternatively, the starting conditions may be set such that the present process is started upon receiving an instruction from outside.

Figure 3:
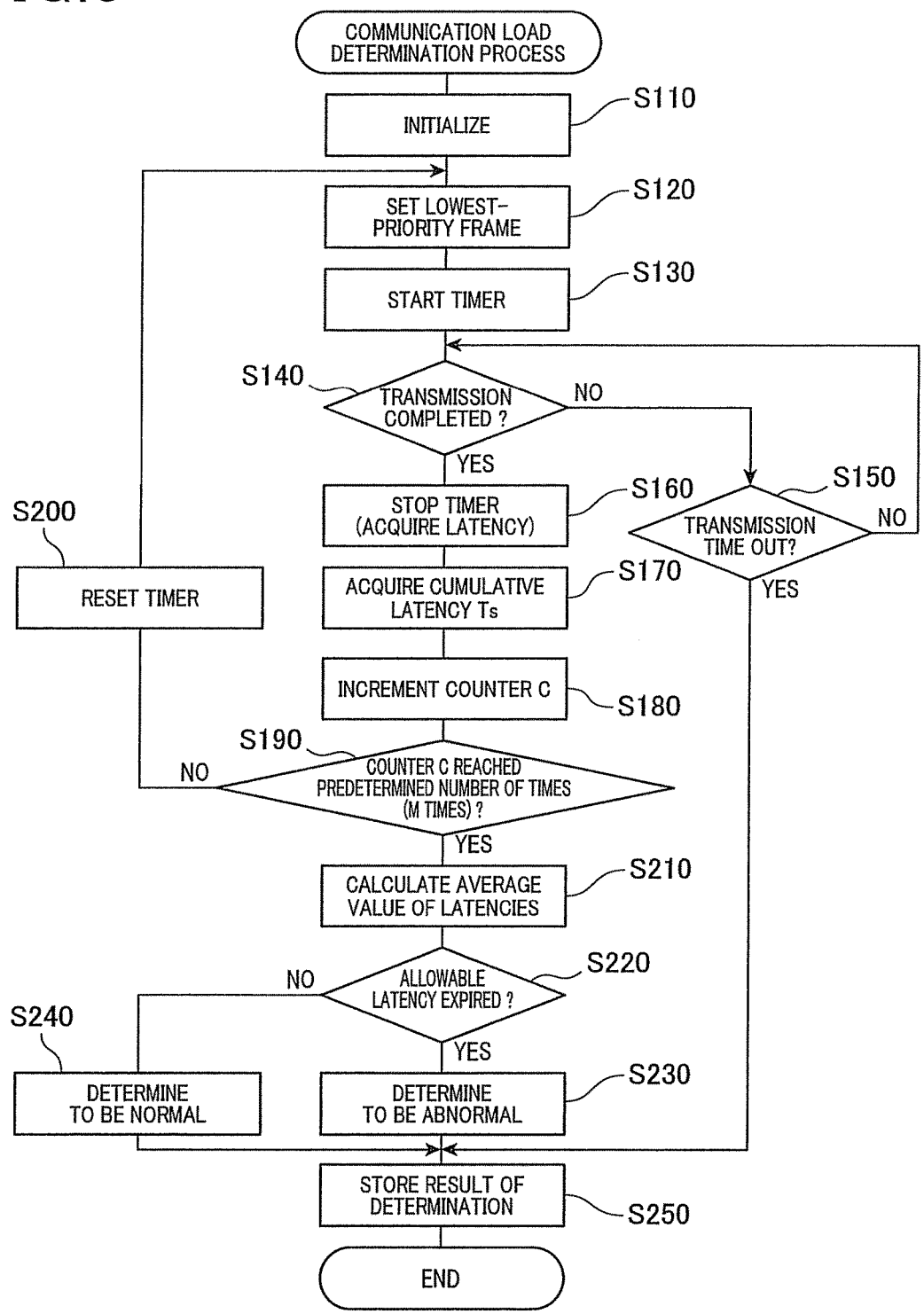
FIG. 3 is a flow diagram illustrating a communication load determination process performed in the communication system illustrated in FIG. 1.

FIG. 3 is a flow diagram illustrating the communication load determination process performed in the communication system 1 by the processor 50.

As shown in FIG. 3, in the communication load determination process, a counter C, i.e. a variable, and a cumulative transmission latency Ts are initialized first (step S110). Then, a detection frame in which the lowest-priority ID is set is stored in the message box 40*a* (step S120), followed by starting a timer 80 incorporated in the microcomputer 30 (step S130). After that, the communication controller 40 performs the transmission control under which the detection frame is transmitted onto the bus.

After that, the status register 40*b* is monitored (step S140). Then, control stands by until the status register 40*b* indicates a status of transmission completion or until the standby time exceeds a predetermined time-out period (until time-out occurs). If time-out occurs (YES at step S150), the processor 50 determines that abnormality has occurred in the communication load, followed by storing the result of the determination in the storage 70 (step S250).

Then, the process is halted until the next iteration. On the other hand, if the status register 40*b* indicates a status of transmission completion within the time-out period (YES at step S140), the timer 80 is stopped to acquire a transmission latency (step S160), followed by updating the cumulative transmission latency Ts that is a cumulative value of acquired transmission latencies (step S170).

Then, the processor 50 determines whether or not the counter C is equal to a predetermined number of times (N times), the counter C counting the number of times of acquiring a transmission latency following transmission of the detection frame (step S190). If the value of the counter C is less than N (NO at step S190), the timer 80 is reset (step S200), followed by retransmitting the transmission frame to repeat the series of steps of acquiring a transmission latency (steps S120 to S190).

If the counter C shows the predetermined number of times N (NO at step S190), the cumulative transmission latency Ts is divided by the predetermined number of times N to thereby calculate an average value of the transmission latencies (step S210).

The average value is compared with a predetermined allowable latency (step S220). If the average value is equal to or less than the allowable latency (NO at step S220), the load condition is determined to be normal (step S240). If the average value is larger than the allowable latency (exceeds the allowable latency) (YES at step S220), the load condition is determined to be abnormal (step S230). Then, the result of the determination is stored in the storage 70 (step S250).

Specifically, because of having the lowest priority, the detection frame repeatedly loses arbitration when the load condition of the bus 90 becomes high. Thus, a transmission latency is caused before completing transmission to the bus 90.

In the present process, the processor 50 measures in advance an average value of transmission latencies in the case where the load of the bus is regarded to be normal. An upper limit of the measurement value is determined to be an allowable latency. Then, the processor 50 compares the predetermined allowable latency with the average value of transmission latencies measured in the above process to thereby determine the occurrence of abnormality in the communication load of the bus 90.

4. Effects

As described above, the load determining apparatus 20 of the present embodiment has a simplified configuration in which the communication protocol function is used to measure a transmission latency of the detection frame having a lowest-priority ID. With this configuration, the load determining apparatus 20 is able to determine the occurrence of abnormality in the communication load. Further, the load determining apparatus 20 does not hinder the transmission of a frame having an ID with a high priority.

Unlike the conventional apparatuses, the apparatus of the present invention does not have to receive all the data that appear on the bus in a predetermined measurement period. Therefore, the occurrence of abnormality in the communication load can be determined without increasing the memory capacity that should be ensured for the processing load of the CPU and for the reception of communication frames.

According to the load determining apparatus 20 configured as described above, abnormality in the communication load is detected if a malicious third party mounts a fraudulent device on the in-vehicle LAN via the connector 7, which device drastically increases the communication load of the in-vehicle LAN. Accordingly, the load determining apparatus 20 is able to recognize the presence of the fraudulent device as one of the causes of inducing abnormality in the communication load, thereby dealing with the cause such as by removing the fraudulent device.

If abnormality occurs in the behaviors of the vehicle during traveling, the load determining apparatus 20 checks the contents of the storage 70. If the contents of the storage 70 include a record that abnormality has occurred in the communication load, the load determining apparatus 20 is able to recognize that a fraudulent device may be present as one of the causes of abnormality in the behaviors of the vehicle.

Since the connector 7 is configured by a general-purpose connector, communication devices, such as a mobile phone and a computer, having a wireless communication function can be connected to the connector 7. If the user of the vehicle connects such devices having a wireless communication function, on his/her own, to the connector 7, a malicious third party may use the wireless communication function of these devices to perform communication that extraordinarily increases the communication load of the in-vehicle LAN.

In such a case as well, the load determining apparatus 20 is able to detect abnormality in the communication load. Accordingly, by confirming the contents of the storage 70 afterward, the presence of the third party device that has maliciously performed communication can be recognized, as one of the causes of inducing abnormality in the communication load.

In a communication system such as an in-vehicle LAN, the process for periodically transmitting a frame is performed as in a process to transmit measurement values of sensors, for example. For this reason, when the detection frame is attempted to be transmitted with the timing of the periodical process, the transmission latency of the detection frame may be increased more than what is expected from the original communication load of the bus.

In this regard, in the present embodiment, the detection frame is transmitted for a plurality of times to calculate an average value of the transmission latencies, based on which the load determining apparatus 20 determines whether or not abnormality has occurred. Thus, the influence of the periodical process is suppressed to thereby enhance the accuracy of a determination.

Each ECU 10 of the present embodiment corresponds to the communication device. The communication load determining ECU 20 corresponds to the communication load determining apparatus. The storage 70 corresponds to the storing means. Further, the processor configures the lowest-priority frame transmitting means or unit, the measuring means and the determining means or unit. Step S120 of FIG. 3 corresponds to the process as the function of the lowest-priority frame transmitting means or unit. Steps S130 to S160 correspond to the process as the function of the measuring means or unit. The step S220 corresponds to the process as the function of the determining means or unit.

(Second Exemplary Embodiment)

Referring to FIG. 2, hereinafter is described a second exemplary embodiment of the present invention.

The communication load determination process according to the first embodiment described above has acquired an average value of the transmission latencies of the detection frame, for use as a determination value for determining the occurrence of abnormality in the communication load.

In the second embodiment, the determination value is different from the one used in the first embodiment. The following description is focused on differences from the first embodiment in the communication load determination process.

In the second embodiment, the components identical with or similar to those in the first embodiment are given the same reference numerals for the sake of omitting unnecessary explanation.

1. Communication Load Determination Process

Figure 4:
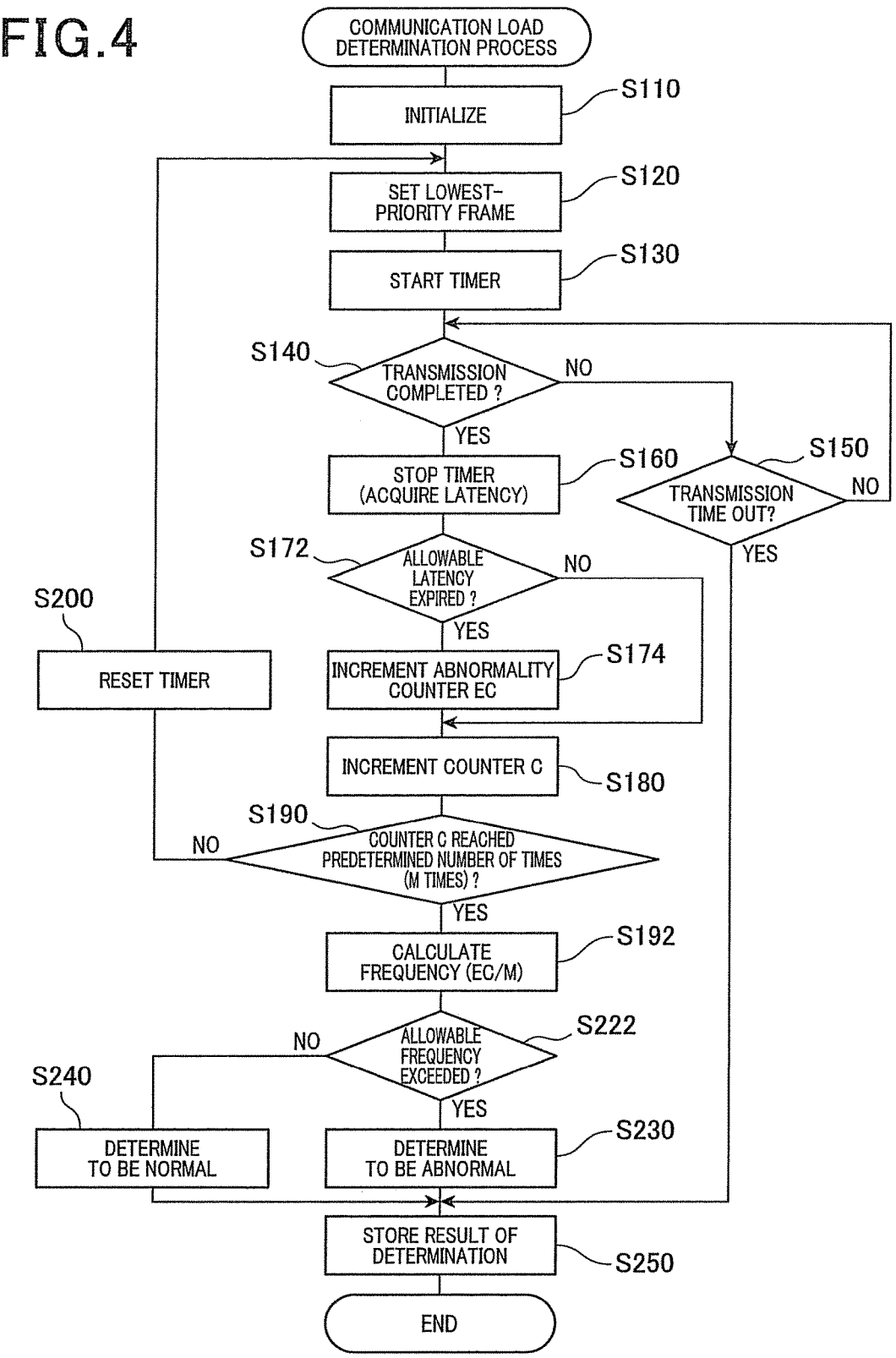
FIG. 4 is a flow diagram illustrating a communication load determination process performed in a communication system according to a second exemplary embodiment.

FIG. 4 is a flow diagram illustrating a communication load determination process performed in the communication system 1 by the processor 50, according to the second embodiment. As shown in FIG. 4, step S111 is performed in the present embodiment, in place of step S110 of the load determination process (see FIG. 3) of the first embodiment. Further, steps S172 to S174 are performed in place of step S170. Furthermore, step S192 is added and step S222 is performed in place of steps S210 and S220.

Specifically, in the communication load determination process of the present embodiment, the counter C and an abnormality counter EC as variables are reset first (step S111). Then, similar to the first embodiment, a transmission latency of the detection frame is acquired (steps S120 to S160).

After that, the processor 50 determines whether or not the acquired transmission latency has exceeded a predetermined allowable latency (step S172). The allowable latency may be the same value as that of the first embodiment, or may be a different predetermined value. If the acquired transmission latency is determined to exceed the allowable latency (YES at step S172), the abnormality counter EC is incremented.

Then, the series of steps is repeated until the counter C reaches a predetermined number of times (M times) (steps S120 to S190).

When the counter C has reached the predetermined number of times M (YES at step S190), the processor 50 acquires how many times the transmission latencies have exceeded the allowable latency in the M number of times, i.e. acquires the frequency that the transmission latencies have exceeded the allowable latency (a value obtained by dividing the value of the abnormality counter EC by the M number of times) (step S192).

Then, the processor 50 determines whether or not the acquired frequency exceeds a predetermined allowable frequency (step S222). If the acquired frequency is equal to or less than the allowable frequency (NO at step S222), the processor 50 determines that abnormality has not occurred in the communication load (normal) (step S240). If the acquired frequency exceeds the allowable frequency (YES at step S222), the processor 50 determines that abnormality has occurred in the communication load (step S230).

Then, the processor 50 stores the result of the determination in the storage 70 (step S250) and terminates the present process.

Specifically, in the present process, the processor 50 determines the occurrence of abnormality in the communication load on the basis of the frequency that the transmission latencies exceed the allowable latency.

The communication load determining apparatus of the present embodiment can also exert the effects similar to those of the first embodiment.

In FIG. 4, step S222 corresponds to the process as the function of the determining means or unit.

[Other Embodiments]

The present invention is not limited to the embodiments described above, but may be implemented, as a matter of course, in other various embodiments.

For example, in the embodiments described above, the load determining apparatus 20 is configured as an apparatus independent of other ECUs 10. However, the load determining apparatus may be configured using the known ECU 10. In other words, an ECU may be configured so that the CPU can perform the load determination process. In this case, the result of a determination may be ensured to be stored in a memory which is provided in the ECU in advance. With this configuration, an ECU having a function similar to that of the load determining apparatus described above can be realized.

In the embodiments described above, the status of the status register 40b is monitored to determine whether or not a frame has been transmitted from the message box 40a onto the bus 90. Alternative to this, a transmission interrupt signal, which is issued by the communication controller in completing transmission of a frame, may be ensured to be directly inputted to an interrupt terminal of the processor (CPU).

The embodiments described above are configured to store the result of a determination in the storage. Alternatively, the communication load determining apparatus may include a display section that notifies a vehicle occupant of the result of a determination via an in-vehicle display unit, or an acoustic section that notifies a vehicle occupant of the result of a determination via an acoustic unit. By visually and acoustically notifying a vehicle occupant of the result of a determination on a real-time basis, the attention of the vehicle occupant (the driver in particular) can be drawn to the problem.

Further, the communication load determining apparatus may include an external transmission means or unit which is able to inform the outside of the vehicle of the result of a determination. Accordingly, if a third party maliciously performs communication for increasing the communication load, the fact of the malicious communication, for example, can be notified to another vehicle on a real-time basis to draw attention of an occupant of another vehicle.

Also, if abnormality occurs in the behaviors of the vehicle due to the malicious communication, the fact of the occurrence of the abnormality due to the malicious communication can be informed to the nearest service station. Thus, for example, the service station can promptly take measures against the malicious communication by performing appropriate maintenance. An external transmission means may have a function, as necessary, of giving information such as to a mobile phone.

Further, the embodiments described above have exemplified an in-vehicle communication system based the CAN protocol. However, this shall not impose a limitation. The present invention may be applied to an in-vehicle communication system based on the CSMA/CD (carrier-sense multiple access with collision detection) communication protocol.

What is claimed is:

1. A communication load determining apparatus for a communication system,
   the communication system including a plurality of communication devices that performs communication via a common bus, the communication system operating in accordance with a communication protocol that defines a priority of each frame transmitted from the communication devices and in which a frame having a lower priority has a longer transmission latency before being transmitted to the bus, the communication protocol being one of a carrier-sense multiple access with collision avoidance (CSMA/CA) communication protocol and a carrier-sense multiple access with collision detection (CSMA/CD) communication protocol;
   the communication load determining apparatus comprising:
   a processor including a timer and a message box, the processor being configured to:
   (i) initialize a counter and a cumulative transmission latency;
   (ii) store, in the message box, a low-priority frame having a lowest priority as compared with other frames transmitted to the bus;
   (iii) initialize and start the timer and transmit the low-priority frame from the message box to the bus;
   (iv) measure, using the timer, a transmission latency of the low-priority frame from a transmission start of the low-priority frame transmitted from the message box to the bus until a transmission completion of the low-priority frame transmitted from the message box to the bus-;
   (iv) add the transmission latency of the low-priority frame to the cumulative transmission latency;
   (v) increment the counter;
   (v) repeat steps (ii) to (v) until the counter reaches a predetermined number of times;
   (vi) calculate an average transmission latency by dividing the cumulative transmission latency by the predetermined number of times; and
   (vii) determine whether or not an abnormality has occurred in a communication load in the bus by comparing the average transmission latency with a predetermined allowable latency to produce a determination result; and
   a storage that stores the determination result produced by the processor.

2. A communication load determining apparatus for a communication system,
   the communication system including a plurality of communication devices that performs communication via a common bus, the communication system operating in accordance with a communication protocol that defines a priority of each frame transmitted from the communication devices and in which a frame having a lower priority has a longer transmission latency before being transmitted to the bus, the communication protocol being one of a carrier sense multiple access with collision avoidance (CSMA/CA) communication protocol and a carrier-sense multiple access with collision detection (CSMA/CD) communication protocol;
   the communication load determining apparatus comprising:
   a processor including a timer and a message box, the processor being configured to:
   (i) initialize a counter and an abnormality counter;
   (ii) store, in the message box, a low-priority frame having a lowest priority as compared with other frames transmitted to the bus;
   (iii) initialize and start the timer and transmit the low-priority frame from the message box to the bus;
   (iv) measure, using the timer, a transmission latency of the low-priority frame from a transmission start of the low-priority frame transmitted from the message box to the bus until a transmission completion of the low-priority frame transmitted from the message box to the bus;
   (v) compare the transmission latency with a predetermined allowable latency and increment the abnormality counter when the transmission latency is greater than the predetermined allowable latency;
   (vi) increment the counter;
   (vii) repeat steps (ii) to (vi) until the counter reaches a predetermined number of times;
   (viii) calculate a frequency with which the transmission latencies measured by the processor exceeded the predetermined allowable latency based on the abnormality counter and the predetermined number of times;
   (ix) comparing the calculated frequency with a predetermined allowable frequency; and (x) determine whether or not an abnormality has occurred in the communication load in the bus by comparing the calculated frequency with a predetermined allowable frequency and determine that the abnormality has occurred in the communication load when the calculated frequency exceeds the predetermined allowable frequency to produce a determination result; and a storage that stores the determination result produced by the processor.

3. The communication load determining apparatus according to claim 1, wherein:
the processor is further configured to transmit the determination result to an external device located outside of a vehicle.

4. The communication load determining apparatus according to claim 3, wherein:
the processor is further configured to perform the measurement in a predetermined measurement cycle.

5. The communication load determining apparatus according to claim 4, wherein:
the measuring cycle is set so as to be randomly changeable.

6. The communication load determining apparatus according to claim 5, wherein:
the communication protocol is the CSMA/CA communication protocol for communication over a controller area network (CAN); and
the communication load determining apparatus is mounted in the vehicle.

7. The communication load determining apparatus according to claim 2, wherein:
the processor is further configured to transmit the determination result to an external device located outside of a vehicle.

8. The communication load determining apparatus according to claim 2, wherein:
the processor is further configured to perform the measurement in a predetermined measurement cycle.

9. The communication load determining apparatus according to claim 7, wherein:
the processor is further configured to perform the measurement in a predetermined measurement cycle.

10. The communication load determining apparatus according to claim 8, wherein:
the measuring cycle is set so as to be randomly changeable.

11. The communication load determining apparatus according to claim 9, wherein:
the measuring cycle is set so as to be randomly changeable.

12. The communication load determining apparatus according to claim 1, wherein:
the communication protocol is the CSMA/CA communication protocol for communication over a controller area network (CAN); and
the communication load determining apparatus is mounted in a vehicle.

13. The communication load determining apparatus according to claim 10, herein:
the communication protocol is the CSMA/CA communication protocol for communication over a controller area network (CAN); and
the communication load determining apparatus is mounted in a vehicle.

14. The communication load determining apparatus according to claim 11, wherein:
the communication protocol is the CSMA/CA communication protocol for communication over a controller area network (CAN); and
the communication load determining apparatus is mounted in the vehicle.

15. A communication load determining method for a communication system including a plurality of communication devices that performs communication via a common bus, the communication system operating in accordance with a communication protocol that defines a priority of each frame transmitted from the communication devices and in which a frame having a lower priority has a longer transmission latency before being transmitted to the bus, the communication protocol being one of a carrier-sense multiple access with collision avoidance (CSMA/CA) communication protocol and a carrier-sense multiple access with collision detection (CSMA/CD) communication protocol, the communication load determining method comprising:

storing, in a message box provided in a processor, a low-priority frame having a lowest priority comparing with other frames transmitted to the bus;

starting a timer provided in the processor, and transmitting, using the processor, the low-priority frame from the message box to the bus;

measuring, using the timer, a transmission latency of the low-priority frame from a transmission start of the low-priority frame transmitted from the message box to the bus until a transmission completion of the low-priority frame transmitted from the message box to the bus;

determining, using the processor, whether or not abnormality has occurred in a communication load in the bus on the basis of the measured transmission latency to produce a determination result; and storing, using a storage, the produced determination result, wherein the step of measuring comprises calculating an average value of transmission latencies that are measured multiple times by the processor, and the step of determining comprises determining whether or not abnormality has occurred in the communication load in the bus by comparing the calculated average value with a predetermined allowable latency.

16. A communication load determining method for a communication system including a plurality of communication devices that performs communication via a common bus, the communication system operating in accordance with a communication protocol that defines a priority of each frame transmitted from the communication devices and in which a frame having a lower priority has a longer transmission latency before being transmitted to the bus, the communication protocol being one of a carrier sense multiple access with collision avoidance (CSMA/CA) communication protocol and a carrier-sense multiple access with collision detection (CSMA/CD) communication protocol, the communication load determining method comprising:

storing, in a message box provided in a processor, a low-priority frame having a lowest priority comparing with other frames transmitted to the bus;

starting a timer provided in the processor, and transmitting, using the processor, the low-priority frame from the message box to the bus;

measuring, using the timer, a transmission latency of the low-priority frame from a transmission start of the low-priority frame transmitted from the message box to the bus until a transmission completion of the low-priority frame transmitted from the message box to the bus;

determining, using the processor, whether or not abnormality has occurred in a communication load in the bus on the basis of the measured transmission latency to produce a determination result; and storing, using a storage, the produced determination result, wherein the step of measuring comprises calculating a frequency with which transmission latencies measured by the processor have exceeded a predetermined allowable latency, and the step of determining comprises determining whether or not abnormality has occurred in the communication load in the bus by comparing the calculated frequency with a predetermined allowable frequency.

\* \* \* \* \*